(12) United States Patent
Sween et al.

(10) Patent No.: US 8,350,808 B2
(45) Date of Patent: *Jan. 8, 2013

(54) MOUSE PAD CARRYING CASE

(75) Inventors: Barry P. Sween, Santa Monica, CA (US); Maaike Evers, San Francisco, CA (US); Mike Simonian, San Francisco, CA (US)

(73) Assignee: Belkin International, Inc., Playa Vista, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/909,733

(22) Filed: Oct. 21, 2010

(65) Prior Publication Data

US 2011/0031138 A1   Feb. 10, 2011

Related U.S. Application Data

(63) Continuation of application No. 11/649,993, filed on Jan. 5, 2007, now Pat. No. 7,843,432.

(51) Int. Cl.
*G09G 5/00* (2006.01)

(52) U.S. Cl. ........ 345/156; 345/163; 361/679; 361/693; 361/726; 361/747

(58) Field of Classification Search .................. 345/156, 345/157, 163; 206/308.1, 307.1, 445, 311, 206/425, 472, 312; 220/324, 326; 383/84, 383/93, 97–99, 104, 105; 361/679.4, 679.57, 361/693, 726, 747
See application file for complete search history.

(56) References Cited

U.S. PATENT DOCUMENTS

| | | | | | |
|---|---|---|---|---|---|
| 179,461 | A | * | 7/1876 | Nolin | 150/152 |
| 2,274,718 | A | * | 3/1942 | Lyndes et al. | 150/117 |
| 2,755,837 | A | * | 7/1956 | Kosek | 383/105 |
| 4,566,130 | A | * | 1/1986 | Coates | 383/15 |
| 6,186,321 | B1 | | 2/2001 | Eskandry | |
| 6,655,647 | B1 | * | 12/2003 | Williams | 248/346.01 |
| 6,989,814 | B1 | * | 1/2006 | Mattson | 345/156 |
| 7,207,539 | B1 | | 4/2007 | Jacobs | |
| 7,281,698 | B2 | * | 10/2007 | Patterson, Jr. | 248/458 |
| D555,351 | S | | 11/2007 | Sween et al. | |
| 7,843,432 | B2 | * | 11/2010 | Sween et al. | 345/163 |
| 2005/0067319 | A1 | | 3/2005 | Wei | |

(Continued)

OTHER PUBLICATIONS

Wholesale—Mouse Pad Laptop Accessories Carrying Case Pouch Bag, http://www.dhgate.com/mouse-pad-laptop-accessories-carrying-case/p-ff80808127274ba . . . , 6 pages. Nov. 10, 2010.

(Continued)

*Primary Examiner* — Quan-Zhen Wang
*Assistant Examiner* — Jennifer Nguyen
(74) *Attorney, Agent, or Firm* — Bryan Cave LLP

(57) ABSTRACT

Carrying cases (e.g., for a computer mouse) comprising a pad and a fastener (e.g., a zipper) around the perimeter of the pad that may form a mouse pad when the fastener is unfastened, and may be folded along a dimension and the fastener fastened to form a storage pouch. Such carrying cases may include a rim to prevent a mouse from sliding off of the mouse pad, an attachment mechanism that may include a strap, a snap button, or both, or a combination thereof. Embodiments are neoprene having a thickness of 1 to 5 mm, have a fold dimension between 15 and 30 cm, or both. The fastener may have a pull tab located at one end of the fold when the fastener is unfastened and at an opposite end of the fold when the fastener is fastened. Pads may be round, oval, or rectangular with rounded corners.

21 Claims, 6 Drawing Sheets

U.S. PATENT DOCUMENTS

2007/0084976 A1      4/2007    Bate et al.

OTHER PUBLICATIONS

Mouse Trap Mice Mouse Pad Carry Case, neoprene, http://www.himfr.com/d-p1117435793554959225-Mouse_Trap_Mice_Mouse_Pad_Carr . . . , 2 pages. Nov. 10, 2010.

Amazon.com: Belkin F5L008-BRN Mouse Trap Mouse Pad, http://www.amazon.com/Belkin-F5L008-BRN-Mouse-Trap-Pad/dp/B000QJ6UCW/ref=s . . . , 6 pages. Nov. 10, 2010.

Mouse Pad/Pouch, https://theintelstore.conn/productcompact2.aspx?catalogid=2&categoryid=0&productid=6 . . . , 1 page. Nov. 10, 2010.

Black Half Circle Mouse Pouch Pad, http://www.brandsdragon.com/products/product_9946.htm, 3 pages. Nov. 10, 2010.

2 in 1 Clock Pattern Convertible Zip-Up Storage Mouse Trap Pad Travel Pouch, http://www.dinodirect.com/mouse-pad-carrying-case.html, 4 pages. Nov. 10, 2010.

Mouse Pad/Pouch, http://www.fortepromo.com/Custom_Imprinted_Mouse_Pad_Pouch_p/45095.htm, 2 pages. Nov. 10, 2010.

Q Pad Pouch (TF138N), http://travelmall.en.made-in-china.com/product/XeQmpExHFGik/China-Q-Pad-Pouch-T . . . , 2 pages. Nov. 10, 2010.

Convertible Zip-Up Mouse Storage/Pad—Black/Black, http://www.casecrown.com/electronics/mouses/convertible-zip-up-mouse-storage-pad-blac . . . , 2 pages. Jul. 28, 2010.

Blue Multifunction Mouse Pad Sleeve Case Bag Holder, http://www.sourcingmap.com/blue-multifunction-mouse-pad-sleeve-case-bag-holder-p-3 . . . , 2 pages. Nov. 10, 2010.

Multifunction mouse pouch pad, http://www.alibaba.com/product-gs/227898130/Multifunction_mouse_pouch_pad.html, 2 pages. Nov. 10, 2010.

Mouse pad, http://www.alibaba.com/product-gs/247860132/Mouse_pad.html, 2 pages. Nov. 10, 2010.

Laptop Netbook Accessories Pouch Bag Mouse Pad bag-gift, http://www.alibaba.com/product-gs/314263830/Laptop_Netbook_Accessories_Pouch_ba . . . , 5 pages. Nov. 10, 2010.

* cited by examiner

500

| 510 ~ | Provide a mouse pad having a perimeter and a fastener located at the perimeter, so that the mouse pad and the fastener can form a storage pouch when the mouse pad is folded and the fastener is fastened |

↓

| 520 ~ | Place an object over an interior surface of the mouse pad |

↓

| 530 ~ | Fold the mouse pad |

↓

| 540 ~ | Fasten the Fastener |

FIG. 6

MOUSE PAD CARRYING CASE

RELATED APPLICATIONS

This patent application is a continuation of, and claims priority to, U.S. patent application Ser. No. 11/649,993 filed on Jan. 5, 2007, having the same title, inventors, and assignee, which is incorporated by reference herein in its entirety.

FIELD OF THE INVENTION

This invention relates generally to carrying cases, for instance, for portable electronic devices and computer accessories, and certain embodiments relate more particularly to mouse pads that convert into a carrying cases, for example, for transport, storage, and protection of portable electronic devices and computer accessories.

BACKGROUND OF THE INVENTION

Electronic devices and computer accessories, such as a mouse for use on a mouse pad or flash drives, have become increasingly portable as technology advances. This invention relates to carrying cases, for example, for these portable electronic devices and computer accessories. These electronic devices and computer accessories are easily damaged or misplaced, and are, in general, hard to manage, without a carrying case. Accordingly, there exists a need for a mechanism capable of safely and conveniently storing and carrying these portable electronic devices and computer accessories while also maintaining their portable nature.

It would, therefore, be advantageous to provide a carrying case for these portable devices that incorporates the best of all previous products and improves upon them. Such a carrying case would allow the user to safely and conveniently store and carry his or her devices. In particular, it would be advantageous to provide an extra function to a mouse pad so it can be converted into a storage and transport device. This feature would be useful for computer users who move from location to location in their home, office, or on a trip, for instance.

SUMMARY OF PARTICULAR EMBODIMENTS OF THE INVENTION

This invention provides, among other things, various carrying cases and mouse pad carrying cases. Particular embodiments provide, as objects or benefits, for example, that they safely and conveniently store and carry portable electronic devices and computer accessories, such as a computer mouse, while also maintaining their portable nature. Thus, various embodiments allow the user to safely and conveniently store and carry his or her devices. In particular, a number of embodiments provide an extra function to a mouse pad so it can be converted into a storage and transport device. This feature is useful for computer users who move from location to location in their home, office, or on a trip, as examples. Other benefits to certain embodiments may be apparent to a person of ordinary skill in the art.

In a variety of specific embodiments, this invention provides, among other things, various mouse pad carrying cases that include a mouse pad, a fastener, and an attachment mechanism that form a storage pouch when the mouse pad is folded and the fastener is fastened. In various such embodiments, the fastener extends around the perimeter of the mouse pad. Further, the attachment mechanism is capable of attaching the mouse pad carrying case to another object, and includes a fabric strap and a snap button. Moreover, the mouse pad is folded along a major dimension through the center of the mouse pad when the fastener is fastened and the mouse pad is folded to form the storage pouch.

In some such embodiments, the mouse pad includes neoprene having a thickness between 1 and 5 mm and the major dimension is between 15 and 30 cm, and in particular embodiments, the mouse pad has a thickness between 2 and 3 mm and the major dimension is between 20 and 25 cm. Further, in some embodiments, the fastener is located at the entire perimeter, the fastener is a zipper with a pull tab, or both. Even further, in certain embodiments, the pull tab is located at a first end of the major dimension when the zipper is fastened and the mouse pad is folded to form the storage pouch, and the pull tab is located at an opposite second end of the major dimension when the zipper is unfastened and the mouse pad is laid flat to be used as a mouse pad. Further still, in some embodiments, the attachment mechanism is coupled to the mouse pad at the second end of the major dimension.

Furthermore, certain embodiments include a rim at the perimeter of the mouse pad, for instance, to prevent a mouse from sliding off a top surface of the mouse pad on an uneven or slanted surface when the mouse pad is in use as a mouse pad. In addition, in some embodiments, the fastener is further away from the center of the mouse pad than the rim. Moreover, in particular embodiments, the shape of the mouse pad is a single circle and the major dimension is a diameter of the single circle, while in other embodiments, the shape is an oval or a rectangle having rounded corners.

In other specific embodiments, this invention provides, among other things, various mouse pad carrying cases that include a mouse pad and a fastener that form a storage pouch when the mouse pad is folded and the fastener is fastened, that include a rim (e.g., that includes piping) to prevent a mouse from sliding off a top surface of the mouse pad on an uneven or slanted surface when the mouse pad is in use as a mouse pad. In such embodiments, when the fastener is unfastened and the mouse pad is laid flat to be used as a mouse pad, the rim is located between the fastener and the center. As for the previous embodiments described, the mouse pad is folded through its center when the fastener is fastened and the mouse pad is folded to form the storage pouch.

In some such embodiments, the fastener includes a zipper, the mouse pad is folded along a major dimension of the shape when the zipper is fastened and the mouse pad is folded to form the storage pouch, the zipper has a pull tab, and the mouse pad carrying case is configured so that the pull tab is located at a first end of the major dimension when the zipper is fastened, and at an opposite second end of the major dimension when the zipper is unfastened. Further, in various embodiments, the major dimension is between 15 and 30 cm, and the shape of the mouse pad may be a single circle (e.g., the major dimension is a diameter of the single circle), an oval, or a rectangle having rounded corners. Various such embodiments may further include an attachment mechanism that is capable of attaching the mouse pad carrying case to another object, which may include a fabric strap and a snap button, for example.

Still other specific embodiments include various carrying cases that include a neoprene pad having a thickness between 1 and 5 mm and a zipper having a pull tab, wherein the pad and the zipper form a storage pouch when the pad is folded and the zipper is zipped. In these embodiments, the zipper extends around the perimeter of the pad when the zipper is unzipped and the pad is laid flat, and the pad is folded along a dimension of the pad when the zipper is zipped and the pad is folded to form the storage pouch. This dimension is between 15 and 30 cm, in this embodiment, and the pull tab is located at a first end of the dimension when the zipper is zipped and the pad is folded to form the storage pouch, although the pull tab is located at an opposite second end of the dimension when the zipper is unzipped and the pad is laid flat.

In some embodiments, such a carrying case may further include an attachment mechanism for attaching the carrying case to another object. In certain embodiments, the attachment mechanism is coupled to the pad at the second end of the dimension, the attachment mechanism includes a fabric strap and a snap button, or a combination thereof, as examples. Further, in particular embodiments, the carrying case includes a rim at the perimeter of the pad, and in particular embodiments, when the zipper is unzipped and the pad is laid flat, the rim is located between the fastener and the center. Moreover, in some embodiments, the shape of the pad is a single circle, an oval, or a rectangle having rounded corners, as examples. Furthermore, in particular embodiments, the carrying case includes a pocket for storage having an opening.

In addition, various other embodiments of the invention are also described herein.

BRIEF DESCRIPTION OF THE DRAWINGS

The invention will be better understood from a reading of the following detailed description, taken in conjunction with the accompanying figures in the drawings in which:

FIG. 6 is a flow chart illustrating a method of using a mouse pad according to an embodiment of the present invention.

Figure 1:
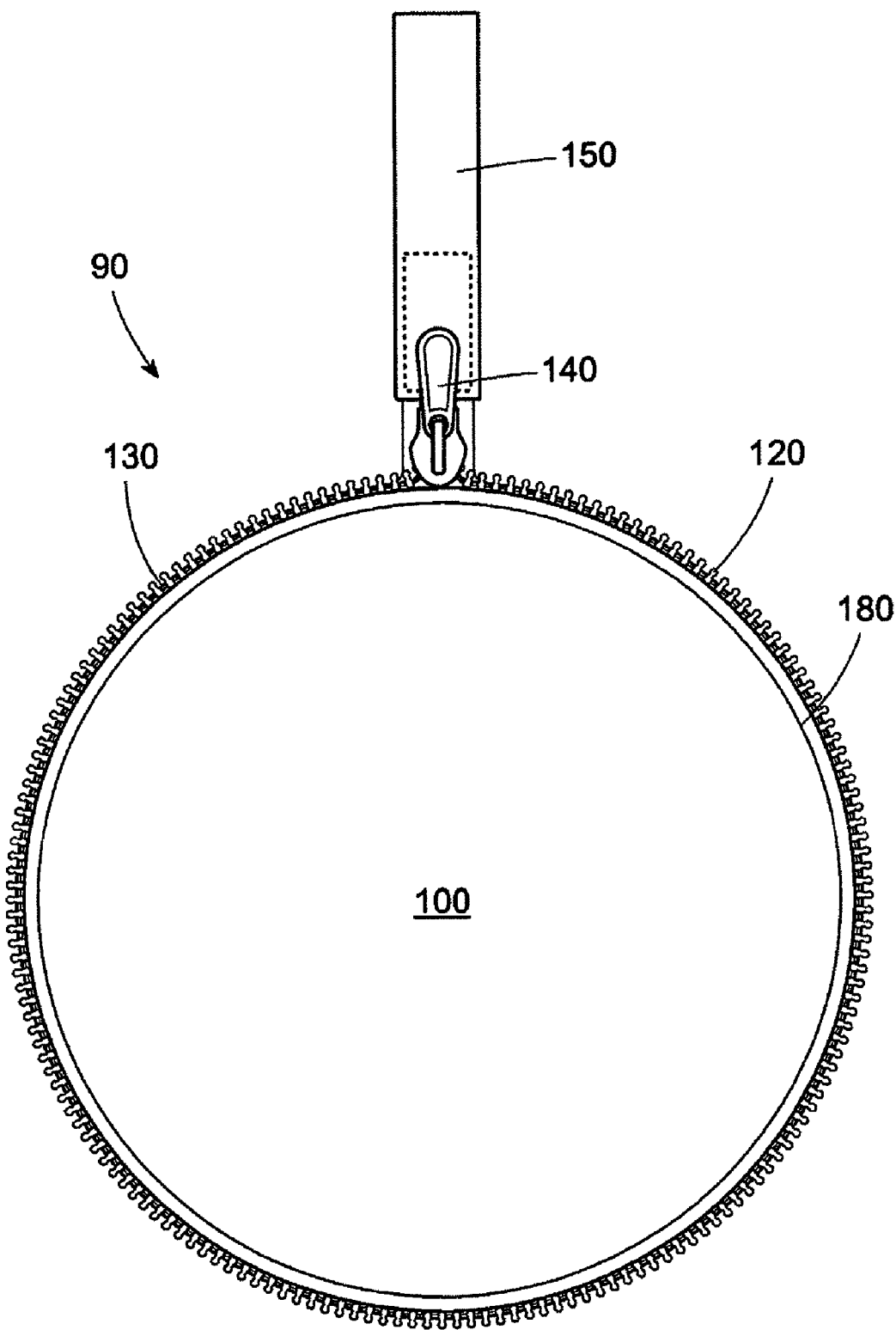
FIG. 1 is a view of an open foldable mouse pad according to an embodiment of the present invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF EXAMPLES OF EMBODIMENTS

In various embodiments, the mouse pad carrying case is a mouse pad that converts into a carrying case or other storage pouch for a mouse or other computer or electronic accessories so they can be easily carried from one location to another in the home or office, or going to another location all together, as examples. In a number of embodiments, the mouse pad has a fastener which extends around the perimeter of the mouse pad, so that when the mouse pad is folded in half the fastener can be fastened to itself to allow the mouse pad to become a storage pouch or carrying case. In such embodiments, this folding in half of the mouse pad creates the pouch in which the mouse or other computer or electronic accessories can be stored. The mouse pad storage pouch or carrying case can fit one or more objects.

In certain embodiments, the mouse pad carrying case has a mouse pad and a fastener, wherein the mouse pad and the fastener form a storage pouch when the mouse pad is folded and the fastener is fastened. In particular embodiments, the mouse pad carrying case contains a top surface and a bottom surface opposite the top surface, and the top surface may be designed to be used as a surface on which a mouse is operated.

As used herein, the term "fastener" means something that fastens. Non-limiting examples of fasteners include zippers, Velcro, buttons and corresponding button holes, and male and female snap buttons. In a number of embodiments, the fastener is a zipper.

In various embodiments, the mouse pad may be of a shape and size that, when folded in half, has the ability to form a pouch. In particular embodiments, for example, the mouse pad may be circular, oval-shaped, square with right-angle corners, or rectangular-shaped with rounded corners. In certain embodiments, the mouse pad is circular-shaped with a diameter of from about 15 cm (centimeters) to about 30 cm, and in particular embodiments, from about 20 cm to about 25 cm, for instance, about 22 cm.

In some embodiments of the mouse pad carrying case, a zipper is added to the perimeter of a neoprene circular mouse pad which allows the mouse pad to convert into a storage pouch. The thickness of the neoprene may be from about 1 mm (millimeters) to about 5 mm, for instance, from about 2 mm to about 3 mm, and in particular embodiments, about 2 mm, as examples.

Certain embodiments provide a mouse pad comprising a pocket for storage of computer and electronic accessories, e.g., a mouse or flash drive. The pocket of the mouse pad can be a shape and size, and large enough for a mouse, and the pocket of the mouse pad can be located where use of the mouse pad with a mouse is not hampered by the placement of the pocket. In some embodiments, the pocket is placed towards the perimeter of the mouse pad, at the bottom surface of the mouse pad, or both, as examples. The pocket has an opening, in a number of embodiments, and the opening can be closable or sealable, for instance. The opening of the pocket can be closed or sealed such that the object in the pocket will not accidentally fall out of the pocket, for example. The mouse pad can be of various sizes and shapes. In different embodiments, for example, the mouse pad is circular, oval-shaped, square with right-angle corners, or rectangular-shaped with rounded corners, for instance.

Further embodiments provides a mouse pad comprising a rim, such as, for example, a perimeter of piping, to prevent a mouse from sliding off a top surface of the mouse pad on or located over an uneven or slanted surface when the mouse pad is in use.

Even further, in some embodiments, the mouse pad has an attachment mechanism coupled to it. The attachment mechanism can be capable of attaching the mouse pad to another object, for instance. For example, the attachment mechanism can be used to attach the mouse pad to a case handle, belt loop, backpack, or the attachment mechanism can simply be used as a carrying handle. In particular embodiments, the attachment mechanism may be designed to point away from the user when the mouse pad is in use. The attachment mechanism can be metal (e.g., key ring) or fabric (e.g., Velcro strap, strap with snap button, or strap with button and button hole).

In certain embodiments, the attachment mechanism is a Velcro strap with male and female Velcro binding swatches placed within it. In particular embodiments, the attachment mechanism is a strap, which, when folded in half, is 160 mm long and 30 mm wide, for example, with male and female Velcro binding swatches (40×30 mm) placed within it.

In further embodiments, the mouse pad has a non-skid pattern printed on or molded to the under or bottom side of the mouse pad to eliminate or reduce sliding on table surfaces, for example. In some embodiments, the non-skid pattern printed on or molded to the under or bottom side of the mouse pad may be a high-friction silicone or textured rubber material, for instance.

Other embodiments include various methods of folding a mouse pad. Such a method may include folding a mouse pad having a fastener and fastening the fastener to keep the mouse pad folded. In various methods, the mouse pad also has a surface for accommodating a mouse and, prior to completely fastening the fastener, an object can be placed over the surface of the mouse pad. Also, the mouse pad can have a perimeter, and the fastener may be located at the perimeter. As used herein, the phrase "prior to completely fastening" includes, for example, prior to buttoning the last of several buttons, prior to fully zipping the zipper closed, etc.

Other embodiments include various methods of enclosing an object in a mouse pad carrying case. Such methods may include placing an object on or over an interior surface of a mouse pad having a perimeter and a fastener located at the perimeter, so that the mouse pad and the fastener can form a storage pouch when the mouse pad is folded and the fastener is fastened; folding the mouse pad; and fastening the fastener, for example.

Figure 3:
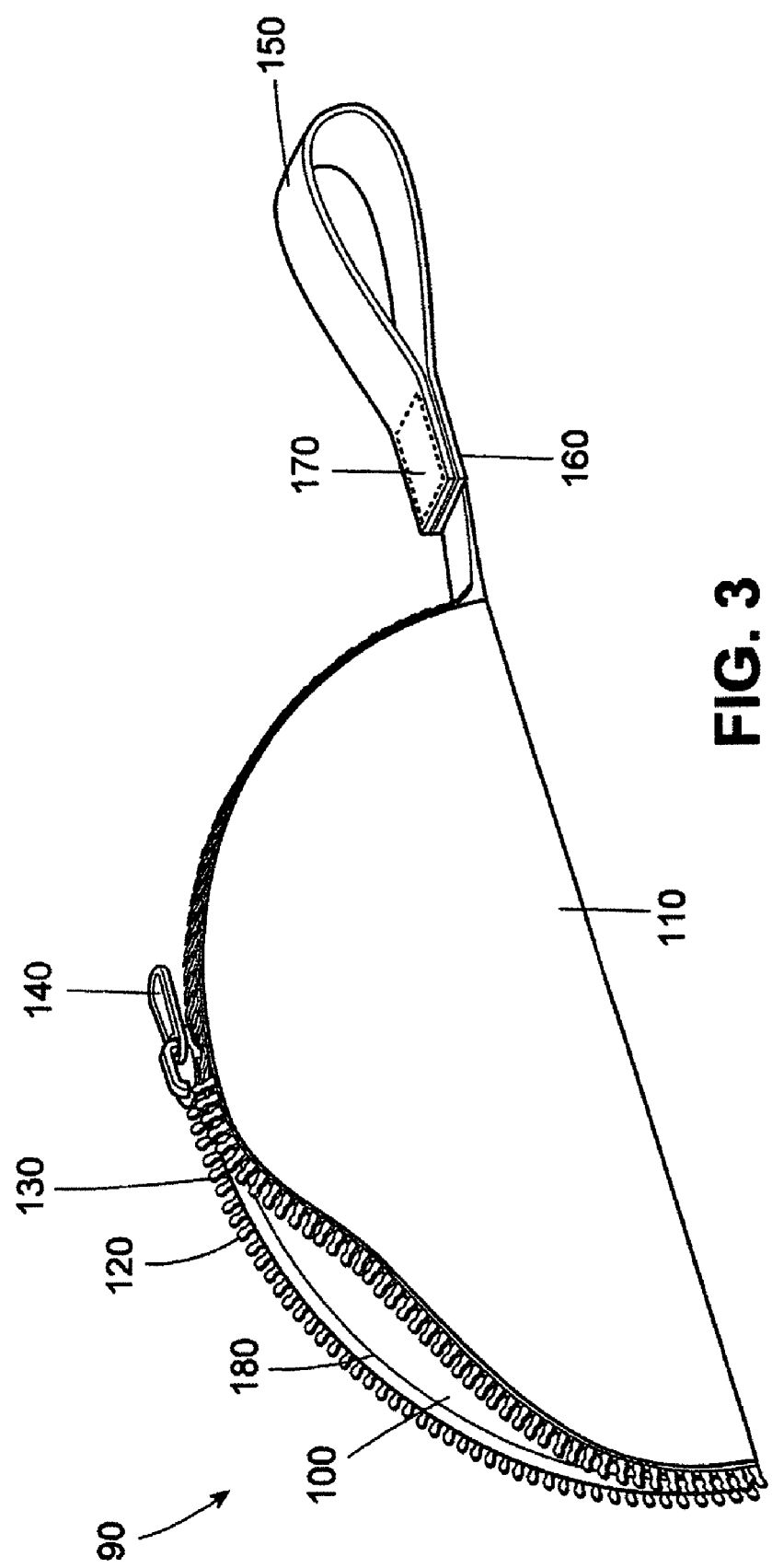
FIG. 3 is a view of a folded mouse pad of FIG. 1 according to an embodiment of the present invention.

FIG. 1 is a view of an open foldable mouse pad 90 according to an embodiment of the present invention. FIG. 3 is a perspective view of a folded and partially fastened mouse pad 90 of FIG. 1 according to an embodiment of the present invention. As illustrated in FIGS. 1 and 3, the foldable mouse pad perimeter contains a perimeter of piping 180, zipper binding 130, and zipper 120. Zipper pull tab 140 is attached to the zipper 120. The top surface of the mouse pad 100 extends to the end of the piping perimeter 180. Zipper 120 is located further away from a center of the mouse pad 90 than the piping perimeter 180. The bottom surface 110 of the mouse pad is a non-skid pattern, which is printed on or molded to the under or bottom side of the mouse pad.

Figure 2:
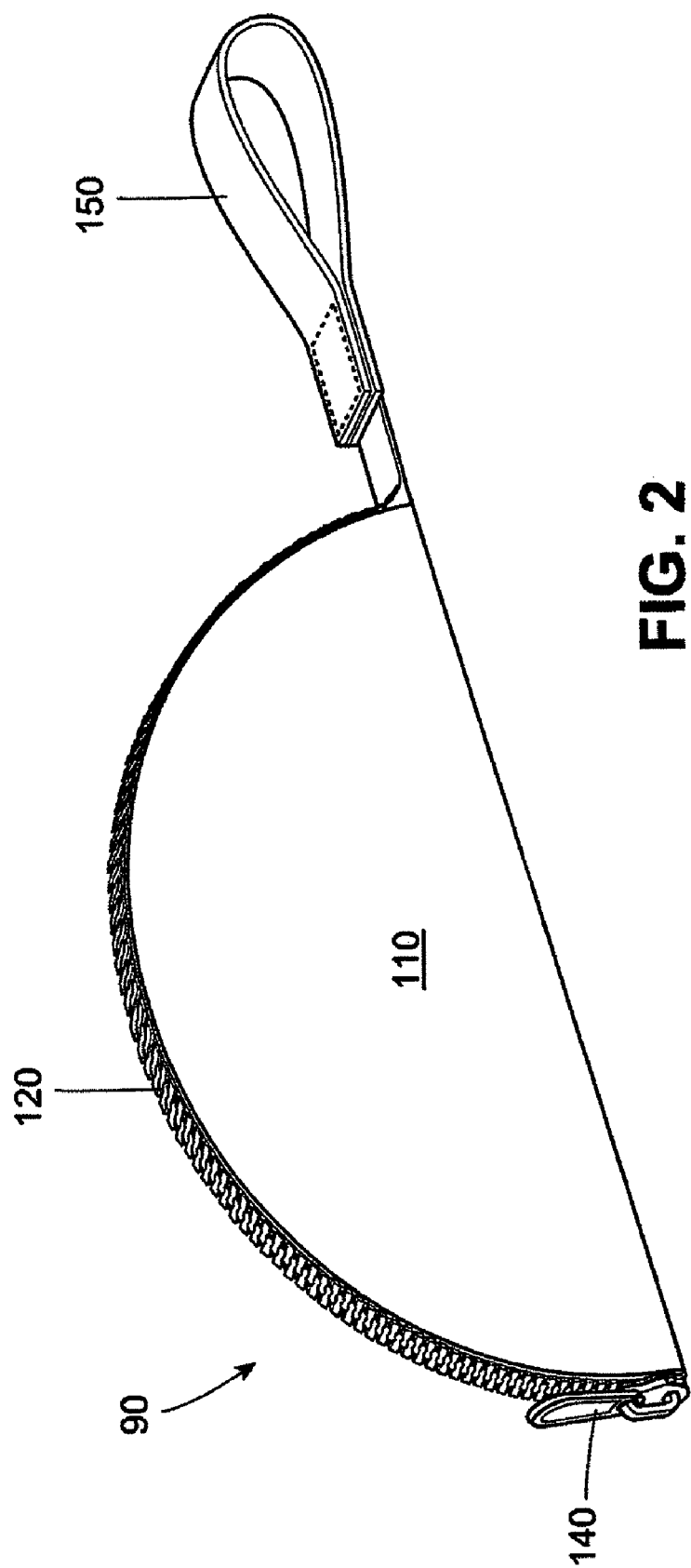
FIG. 2 is a view of a folded mouse pad of FIG. 1 according to an embodiment of the present invention.
Figure 4:
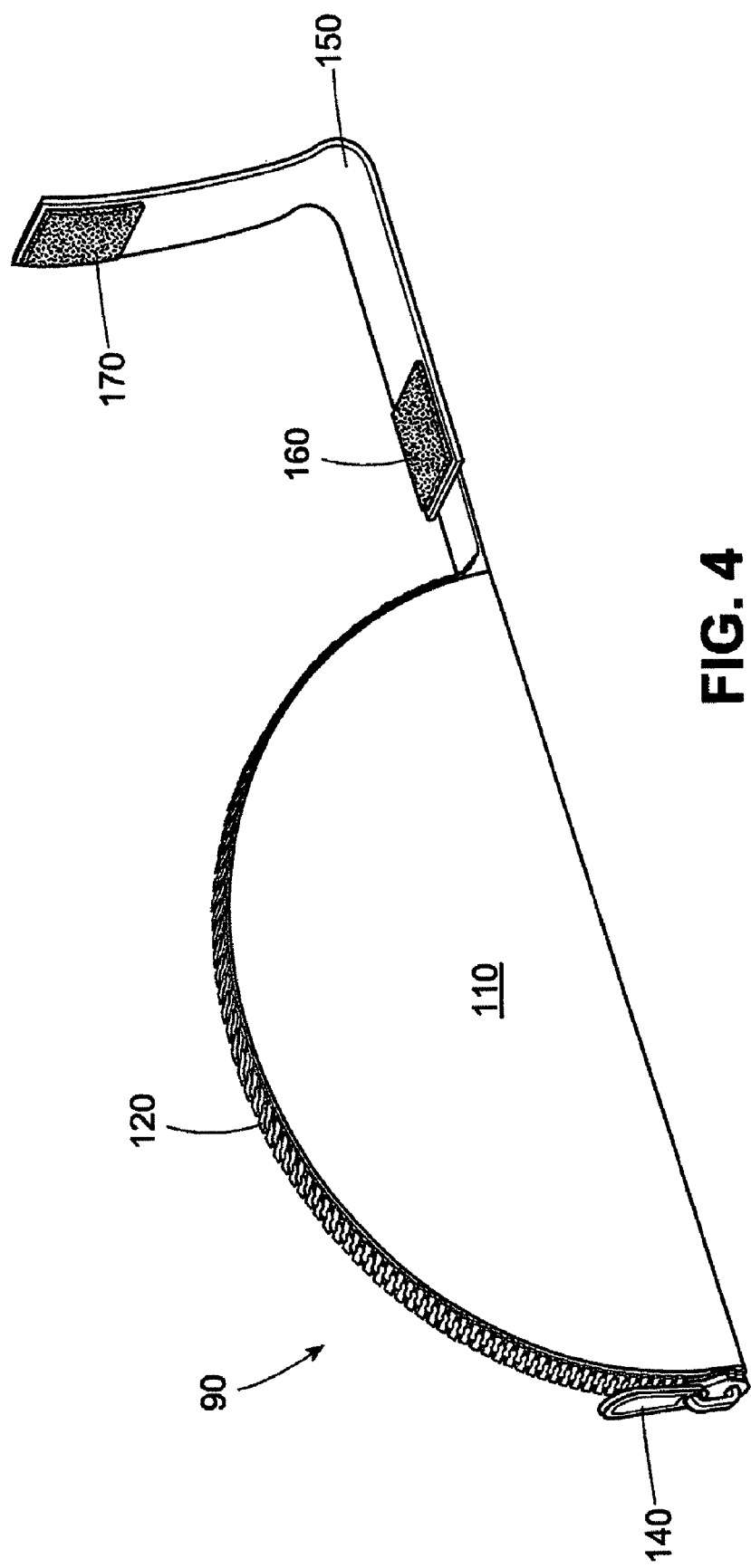
FIG. 4 is a view of the attachment mechanism of FIGS. 1, 2, and 3 according to an embodiment of the present invention.

FIG. 2 is a view of a folded and fastened, or zipped, mouse pad 90 of FIG. 1. In FIG. 2, the mouse pad 90 is in a folded position and zipped closed forming a pouch. As illustrated in FIGS. 1, 2, and 3, the mouse pad has an attachment mechanism 150. As further illustrated in FIG. 4, the mouse pad attachment mechanism 150 comprises female Velcro 160 and male Velcro 170. Attachment mechanism 150, however, can exist in a variety of configurations other than that just described. As just one example of such an alternate embodiment, the attachment mechanism can be in the shape of a metal key ring.

Figure 5:
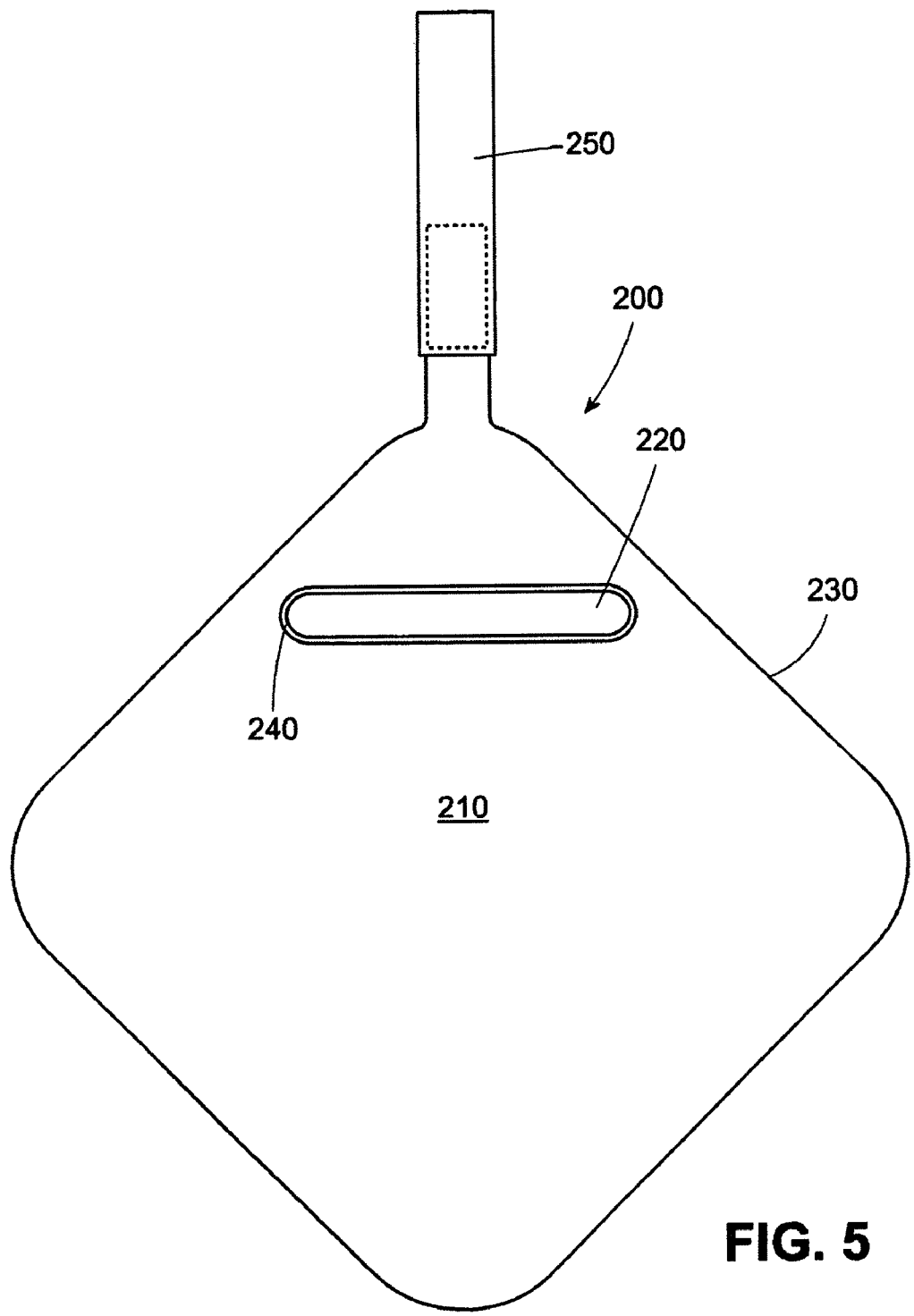
FIG. 5 is a view of a mouse pad with a pocket according to an embodiment of the present invention.

FIG. 5 is a view of a mouse pad 200 comprising a pocket 220 for example, for storage of computer and electronic accessories. The mouse pad surface 210 has a perimeter 230 and the mouse pad pocket 220 has a perimeter 240. The mouse pad pocket 220 may be capable of receiving a portable electronic device or computer accessory, for example. This illustration also has an attachment mechanism 250 attached to the mouse pad.

FIG. 6 is a flow chart illustrating a method 500. A step 510 of method 500 is to provide a mouse pad having a perimeter and a fastener located at the perimeter, for instance, so that the mouse pad and the fastener can form a storage pouch when the mouse pad is folded and the fastener is fastened. Another step 520 of the method 500 is to place an object on or over an interior surface of the mouse pad. Another step 530 of the method 500 is to fold the mouse pad, and an even further step 540 of the method 500 is to fasten the fastener.

Although described with reference to specific embodiments, it will be understood by those skilled in the art that various changes may be made without departing from the scope of the invention. Various examples of such changes have been given in the foregoing description. Accordingly, the disclosure of different embodiments is intended to be illustrative and is not intended to be limiting. It is intended that the scope of the invention shall be limited only to the extent required by the appended claims. For example, to one of ordinary skill in the art, it will be readily apparent that the attachment mechanism discussed herein may be implemented in a variety of embodiments, and that the foregoing discussion of certain of these embodiments does not necessarily represent a complete description of all possible embodiments. Rather, the detailed description of the drawings, and the drawings themselves, disclose alternative embodiments. As another example, the mouse pad 200 of FIG. 5 can include a fastener and/or perimeter of piping. As a further example, in different embodiments, the fastener can be located only at a perimeter of the mouse pad, partially at the perimeter and partially elsewhere on the mouse pad, or at the entire perimeter. As an additional example, in different embodiments, the mouse pad can be folded in thirds, quarters, etc. to form the storage pouch.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A mouse pad carrying case comprising:
a mouse pad; and
a fastener;
wherein:
the mouse pad and the fastener form a storage pouch when the mouse pad is folded and the fastener is fastened;
the mouse pad has a shape when the fastener is unfastened and the mouse pad is laid flat to be used as a mouse pad;
the shape has a perimeter and the fastener extends around the perimeter of the shape; and
the mouse pad is folded along a major dimension of the shape when the fastener is fastened and the mouse pad is folded to form the storage pouch; and
the fastener is located at the entire perimeter, the fastener has a pull tab, and the mouse pad carrying case is configured so that the pull tab is located at a first end of the major dimension when the fastener is fastened and the mouse pad is folded to form the storage pouch, the pull tab is located at an opposite second end of the major dimension when the fastener is unfastened and the mouse pad is laid flat to be used as a mouse pad.

2. The mouse pad carrying case of claim 1 wherein the mouse pad comprises neoprene having a thickness between 1 and 5 mm and the major dimension is between 15 and 30 cm.

3. The mouse pad carrying case of claim 1 wherein the mouse pad has a thickness between 2 and 3 mm and the major dimension is between 20 and 25 cm.

4. The mouse pad carrying case of claim 1 wherein the fastener is a zipper.

5. The mouse pad carrying case of claim 4 further comprising attachment mechanism that is capable of attaching the mouse pad carrying case to another object, wherein:
the attachment mechanism comprises a fabric strap and a snap button;
the attachment mechanism is coupled to the mouse pad at the second end of the major dimension;
the shape further comprises a center; and
the major dimension passes through the center of the shape.

6. The mouse pad carrying case of claim 1 further comprising a rim at the perimeter of the mouse pad to prevent a mouse from sliding off a top surface of the mouse pad on an uneven or slanted surface when the mouse pad is in use as a mouse pad.

7. The mouse pad carrying case of claim 6 wherein the shape has a center and the fastener is further away from the center of the mouse pad than the rim.

8. The mouse pad carrying case of claim 1 wherein the shape is a single circle and the major dimension is a diameter of the single circle.

9. The mouse pad carrying case of claim 1 wherein the shape is an oval.

10. The mouse pad carrying case of claim 1 wherein the shape is a rectangle having rounded corners.

11. The mouse pad carrying case of claim 1 further comprising attachment mechanism that is capable of attaching the mouse pad carrying case to another object, wherein the attachment mechanism comprises a fabric strap and a snap button.

12. The mouse pad carrying case of claim 1 further comprising attachment mechanism that is capable of attaching the mouse pad carrying case to another object, wherein the attachment mechanism is coupled to the mouse pad at the second end of the major dimension.

13. The mouse pad carrying case of claim 1 wherein the shape further comprises a center and wherein the major dimension passes through the center of the shape.

14. A mouse pad carrying case comprising:
a mouse pad; and
a fastener; wherein:
the mouse pad and the fastener form a storage pouch when the mouse pad is folded and the fastener is fastened;
the mouse pad has a shape when the fastener is unfastened and the mouse pad is laid flat to be used as a mouse pad;
the shape has a perimeter and a center and the fastener extends around the perimeter of the shape;
the mouse pad is folded through the center of the shape when the fastener is fastened and the mouse pad is folded to form the storage pouch;
the fastener comprises a zipper;
the mouse pad is folded along a major dimension of the shape when the zipper is fastened and the mouse pad is folded to form the storage pouch;
the zipper has a pull tab; and
the mouse pad carrying case is configured so that the pull tab is located at a first end of the major dimension when the zipper is fastened and the mouse pad is folded to form the storage pouch, and the mouse pad carrying case is configured so that the pull tab is located at an opposite second end of the major dimension when the zipper is unfastened and the mouse pad is laid flat to be used as a mouse pad.

15. The mouse pad carrying case of claim 14 wherein the mouse pad comprises a rim to prevent a mouse from sliding off a top surface of the mouse pad on an uneven or slanted surface when the mouse pad is in use as a mouse pad, wherein, when the fastener is unfastened and the mouse pad is laid flat to be used as a mouse pad, the rim is located between the fastener and the center.

16. The mouse pad carrying case of claim 15 wherein the major dimension is between 15 and 30 cm.

17. The mouse pad carrying case of claim 15 wherein the shape is a single circle and the major dimension is a diameter of the single circle.

18. The mouse pad carrying case of claim 15 wherein the rim comprises piping.

19. The mouse pad carrying case of claim 14 wherein the shape is an oval.

20. The mouse pad carrying case of claim 14 wherein the shape is a rectangle having rounded corners.

21. The mouse pad carrying case of claim 14 further comprising an attachment mechanism that is capable of attaching the mouse pad carrying case to another object, wherein the attachment mechanism comprises a fabric strap and a snap button.

* * * * *